United States Patent
Wu

(10) Patent No.: US 9,520,648 B2
(45) Date of Patent: Dec. 13, 2016

(54) POLYGON NEAR FIELD COMMUNICATION ANTENNA

(71) Applicant: MEDIATEK INC., Hsin-Chu (TW)

(72) Inventor: Shun-Te Wu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/727,871

(22) Filed: Jun. 2, 2015

(65) Prior Publication Data

US 2016/0028158 A1 Jan. 28, 2016

Related U.S. Application Data

(60) Provisional application No. 62/028,304, filed on Jul. 23, 2014.

(51) Int. Cl.
*H01Q 7/00* (2006.01)
*H01Q 7/06* (2006.01)
*H04B 5/00* (2006.01)

(52) U.S. Cl.
CPC .............. *H01Q 7/06* (2013.01); *H04B 5/0081* (2013.01)

(58) Field of Classification Search
CPC ........................................................ H01Q 7/00
USPC .......................................... 343/788, 700 MS
See application file for complete search history.

(56) References Cited

U.S. PATENT DOCUMENTS

| | | | | |
|---|---|---|---|---|
| 6,510,195 B1 * | 1/2003 | Chappo | ................. | G01T 1/2018 |
| | | | | 250/208.1 |
| 2005/0156040 A1 * | 7/2005 | Young | ................ | G06K 7/10336 |
| | | | | 235/439 |
| 2011/0037660 A1 * | 2/2011 | Cheng | .................... | H01Q 1/243 |
| | | | | 343/700 MS |
| 2014/0104128 A1 * | 4/2014 | Pu | ......................... | H01Q 3/247 |
| | | | | 343/848 |
| 2014/0139380 A1 | 5/2014 | Ouyang et al. | | |
| 2014/0148095 A1 | 5/2014 | Smith et al. | | |
| 2014/0159848 A1 | 6/2014 | Konanur et al. | | |
| 2015/0070215 A1 * | 3/2015 | Alexopoulos | ............ | H01Q 3/26 |
| | | | | 342/365 |
| 2016/0028157 A1 * | 1/2016 | Kim | ........................ | H01Q 5/35 |
| | | | | 343/852 |

* cited by examiner

*Primary Examiner* — Peguy Jean Pierre

(74) *Attorney, Agent, or Firm* — Winston Hsu; Scott Margo

(57) ABSTRACT

A polygon Near Field Communication (NFC) antenna comprises: a first radiation part, a second radiation part, a third radiation part, and at least an antenna feed point. The first radiation part is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern. The second radiation part is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern. The third radiation part is coupled between the first radiation part and the second radiation part.

24 Claims, 17 Drawing Sheets

US 9,520,648 B2

POLYGON NEAR FIELD COMMUNICATION ANTENNA

CROSS REFERENCE TO RELATED APPLICATIONS

This application claims the benefit of U.S. Provisional Application No. 62/028,304, filed on Jul. 23, 2014 and included herein by reference.

BACKGROUND

In general, Near field communication (NFC) devices with a NFC antenna are being integrated into communication devices, such as mobile devices to provide an example, to facilitate the use of these communication devices in conducting daily transactions and facilitate cordless power transfer. For example, instead of carrying numerous credit cards, the credit information provided by these credit cards could be stored onto a NFC device. The NFC device is simply tapped to a credit card terminal to relay the credit information to it to complete a transaction. As another example, a ticketing writing system, such as those used in bus and train terminals, may simply write ticket fare information onto the NFC device instead of providing a ticket to a passenger. The passenger simply taps the NFC device to a reader to ride the bus or the train without the use of a paper ticket.

Please refer to FIG. 1. FIG. 1 is a simplified diagram of a conventional NFC antenna 100. As shown in FIG. 1, the conventional NFC 100 only comprises one radiation part, and the NFC 100 only can provide single-position detection in NFC device. When the NFC 100 is applied to a portable electronic device (such as a smartphone, a tablet, a laptop, or a handheld computing device), the passenger might not be convenient enough to do daily transactions since there the NFC 100 only can provide single-position detection in NFC.

SUMMARY

The disclosed embodiments of the present invention are related to a Near Field Communication (NFC) antenna, and more particularly, to a polygon NFC antenna for multi-position detection in NFC.

It is therefore one of the objectives of the present invention to provide a polygon NFC antenna applied to a portable electronic device (such as a smartphone, a tablet, a laptop, or a handheld computing device) for multi-position detection in NFC, so as to solve the above-mentioned problem.

In accordance with an embodiment of the present invention, a polygon NFC antenna is disclosed. The polygon NFC antenna comprises: a first radiation part, a second radiation part, a third radiation part, and at least an antenna feed point. The first radiation part is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern. The second radiation part is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern. The third radiation part is coupled between the first radiation part and the second radiation part, and the at least an antenna feed point is coupled to the third radiation part.

Briefly summarized, the polygon NFC antenna disclosed by the present invention can be applied to a portable electronic device (such as a smartphone, a tablet, a laptop, or a handheld computing device) for multi-position detection in NFC.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct physical or electrical connection. Accordingly, if one device is coupled to another device, that connection may be through a direct physical/electrical connection, or through an indirect physical/electrical connection via other devices and connections.

Figure 1:
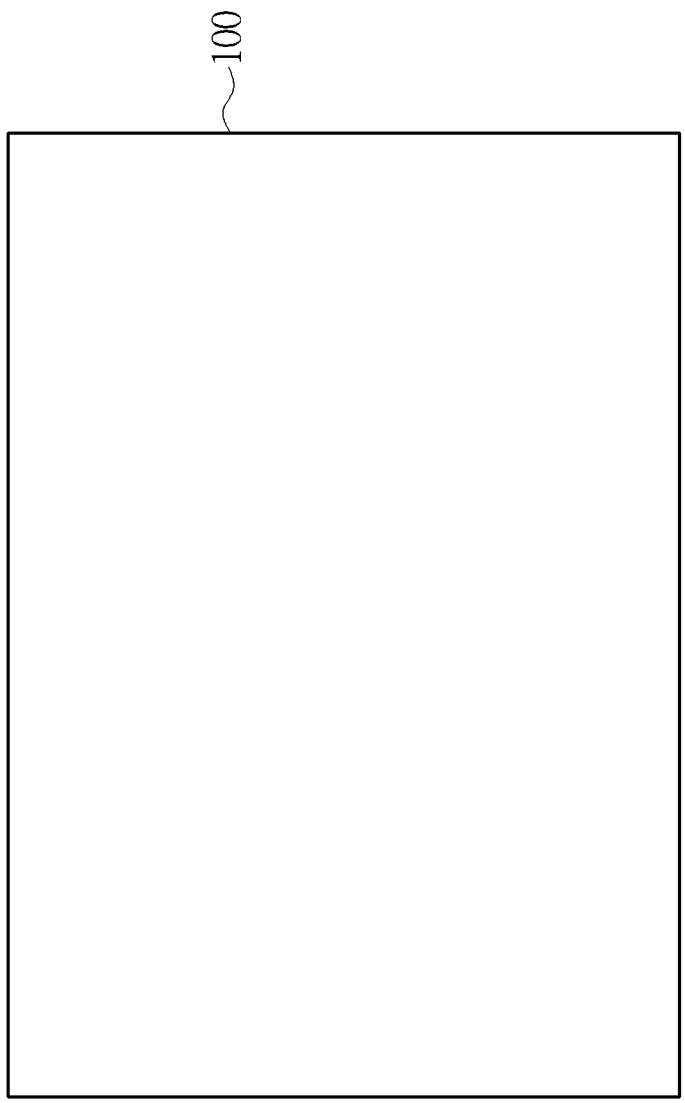
FIG. 1 is a simplified diagram of a conventional NFC antenna.
Figure 2:
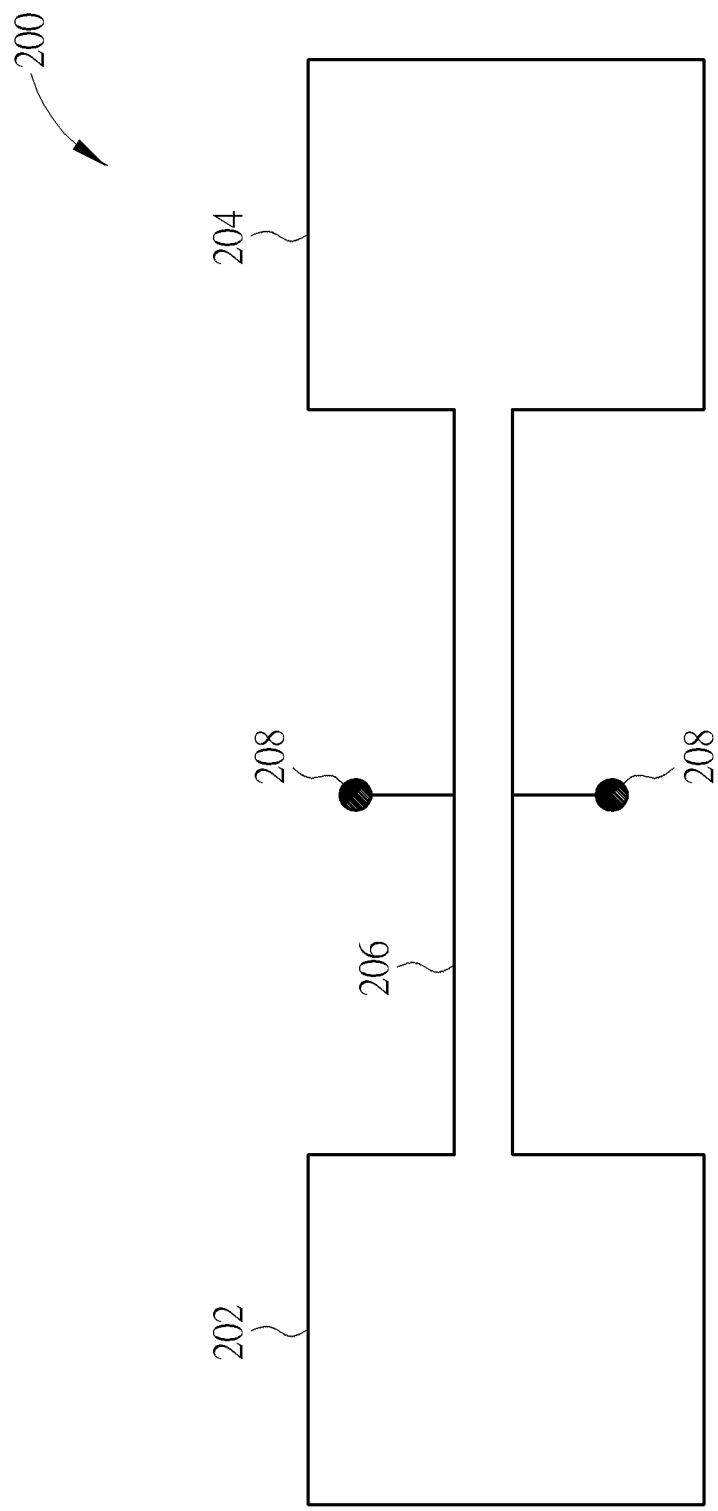
FIG. 2 is a simplified diagram of a polygon NFC antenna in accordance with a first embodiment of the present invention.

Please refer to FIG. 2. FIG. 2 is a simplified diagram of a polygon Near Field Communication (NFC) antenna 200 in accordance with a first embodiment of the present invention. As shown in FIG. 2, the polygon NFC antenna 200 comprises: a first radiation part 202, a second radiation part 204, a third radiation part 206, and two antenna feed points 208. The first radiation part 202 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle.

The second radiation part 204 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 206 is coupled between the first radiation part 202 and the second radiation part 204, wherein the third radiation part 206 is arranged to have a parallel trace with single layer or multi-layer, a parallel wire routing with single layer or multi-layer. The antenna feed points 208 are coupled to the third radiation part 206 and the antenna feed points 208 are located at opposite side of the third radiation part 206. Please note that the rectangle is only for an illustration purpose and are not meant to be a limitation of the present invention. For example, the third radiation part 206 can be arranged to have a cross trace with single layer or multi-layer, a cross wire routing with single layer or multi-layer, a twisted trace with single layer or multi-layer, or a twisted wire routing with single layer or multi-layer.

In addition, the polygon NFC 200 antenna can be formed by a PCB process, an FPCB process, or a copper wire process. The polygon NFC 200 antenna can be applied to a portable electronic device (such as a smartphone, a tablet, a laptop, or a handheld computing device), and the first radiation part 202, the second radiation part 204 and the third radiation part 206 can be positioned on different surfaces of the portable electronic device for multi-position detection in NFC.

Figure 3:
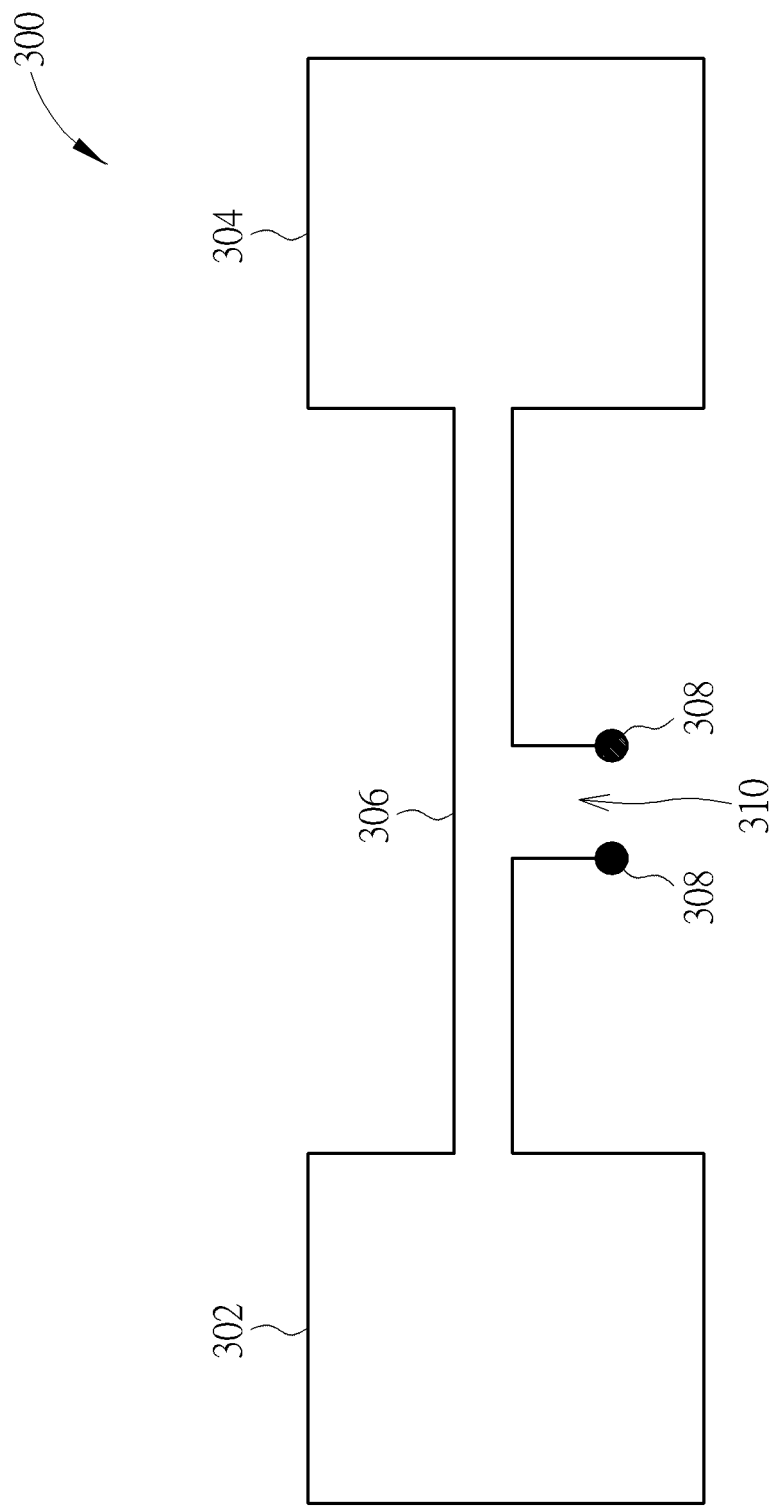
FIG. 3 is a simplified diagram of a polygon NFC antenna in accordance with a second embodiment of the present invention.

Please refer to FIG. 3. FIG. 3 is a simplified diagram of a polygon NFC antenna 300 in accordance with a second embodiment of the present invention. As shown in FIG. 3, the polygon NFC antenna 300 comprises: a first radiation part 302, a second radiation part 304, a third radiation part 306, and two antenna feed points 308, wherein the third radiation part 306 has an opening 310 coupled to the antenna feed points 308. The first radiation part 302 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle. In addition, please note that the above embodiment is only for an illustration purpose and are not meant to be a limitation of the present invention. For example, the antenna feed points 308 can be in any position of the first radiation part 302, the second radiation part 304, and the third radiation part 306, and the opening 310 also can be in any position of the first radiation part 302, the second radiation part 304, and the third radiation part 306.

The second radiation part 304 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 306 is coupled between the first radiation part 302 and the second radiation part 304, wherein the third radiation part 306 is arranged to have a parallel trace with single layer or multi-layer, a parallel wire routing with single layer or multi-layer. Please note that the rectangle is only for an illustration purpose and are not meant to be a limitation of the present invention. For example, the third radiation part 306 can be arranged to have a cross trace with single layer or multi-layer, a cross wire routing with single layer or multi-layer, a twisted trace with single layer or multi-layer, or a twisted wire routing with single layer or multi-layer.

In addition, the polygon NFC 300 antenna can be formed by a PCB process, an FPCB process, or a copper wire process. The polygon NFC 300 antenna can be applied to a portable electronic device (such as a smartphone, a tablet, a laptop, or a handheld computing device), and the first radiation part 302, the second radiation part 304 and the third radiation part 306 can be positioned on different surfaces of the portable electronic device for multi-position detection in NFC.

Figure 4:
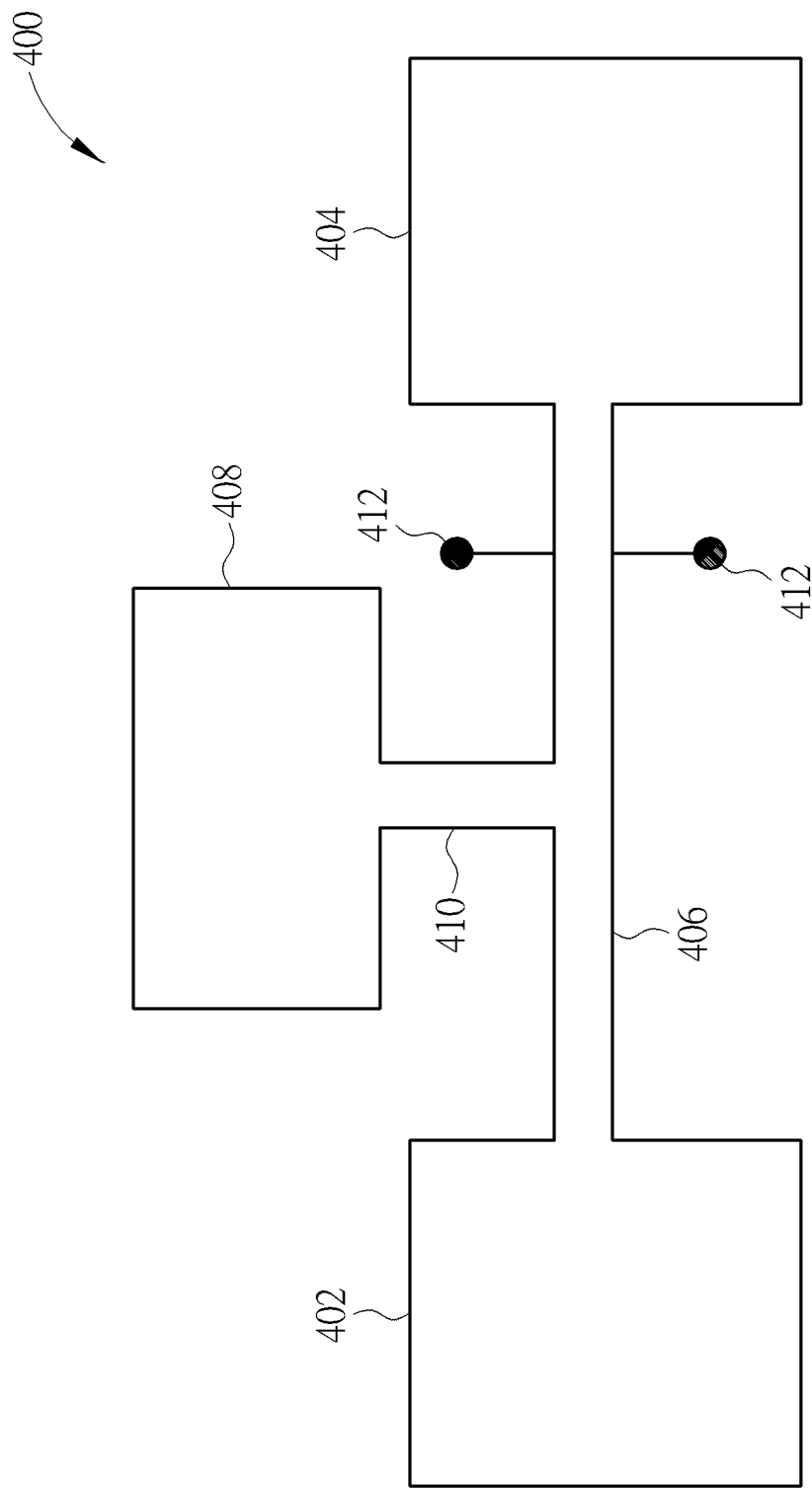
FIG. 4 is a simplified diagram of a polygon NFC antenna in accordance with a third embodiment of the present invention.

Please refer to FIG. 4. FIG. 4 is a simplified diagram of a polygon NFC antenna 400 in accordance with a third embodiment of the present invention. As shown in FIG. 4, the polygon NFC antenna 400 comprises: a first radiation part 402, a second radiation part 404, a third radiation part 406, a fourth radiation part 408, a fifth radiation part 410, and two antenna feed points 412. The first radiation part 402 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle. In addition, please note that the above embodiment is only for an illustration purpose and are not meant to be a limitation of the present invention. For example, the antenna feed points 412 can be in any position of the first radiation part 402, the second radiation part 404, the third radiation part 406, the fourth radiation part 408, and the fifth radiation part 410.

The second radiation part 404 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 406 is coupled between the first radiation part 402 and the second radiation part 404, wherein the third radiation part 406 is arranged to have a parallel trace with single layer or multi-layer, a parallel wire routing with single layer or multi-layer. Please note that the rectangle is only for an illustration purpose and are not meant to be a limitation of the present invention. For example, the third radiation part 406 can be arranged to have a cross trace with single layer or multi-layer, a cross wire routing with single layer or multi-layer, a twisted trace with single layer or multi-layer, or a twisted wire routing with single layer or multi-layer.

The fourth radiation part 408 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a fourth pattern, wherein the fourth pattern is a rectangle in this embodiment. Please note that the rectangle is only for an illustration purpose and are not meant to be a limitation of the present invention. For example, the second pattern can be a square, an ellipse, or a circle.

The fifth radiation part 410 is coupled between the third radiation part 406 and the fourth radiation part 408, wherein the fifth radiation part 410 is arranged to have a parallel trace with single layer or multi-layer, a parallel wire routing with single layer or multi-layer. Please note that the rectangle is only for an illustration purpose and are not meant to be a limitation of the present invention. For example, the fifth radiation part 410 can be arranged to have a cross trace with single layer or multi-layer, a cross wire routing with single layer or multi-layer, a twisted trace with single layer or multi-layer, or a twisted wire routing with single layer or multi-layer. In addition, please note that the above embodiment is only for an illustration purpose and are not meant to be a limitation of the present invention. For example, the fifth radiation part 410 can be coupled between the first radiation part 402 and the fourth radiation part 408, or coupled between the second radiation part 404 and the fourth radiation part 408.

In addition, the polygon NFC 400 antenna can be formed by a PCB process, an FPCB process, or a copper wire process. The polygon NFC 400 antenna can be applied to a portable electronic device (such as a smartphone, a tablet, a laptop, or a handheld computing device), and the first radiation part 402, the second radiation part 404, the third radiation part 406, the fourth radiation part 408, and the fifth radiation part 410 can be positioned on different surfaces of the portable electronic device for multi-position detection in NFC.

Figure 5:
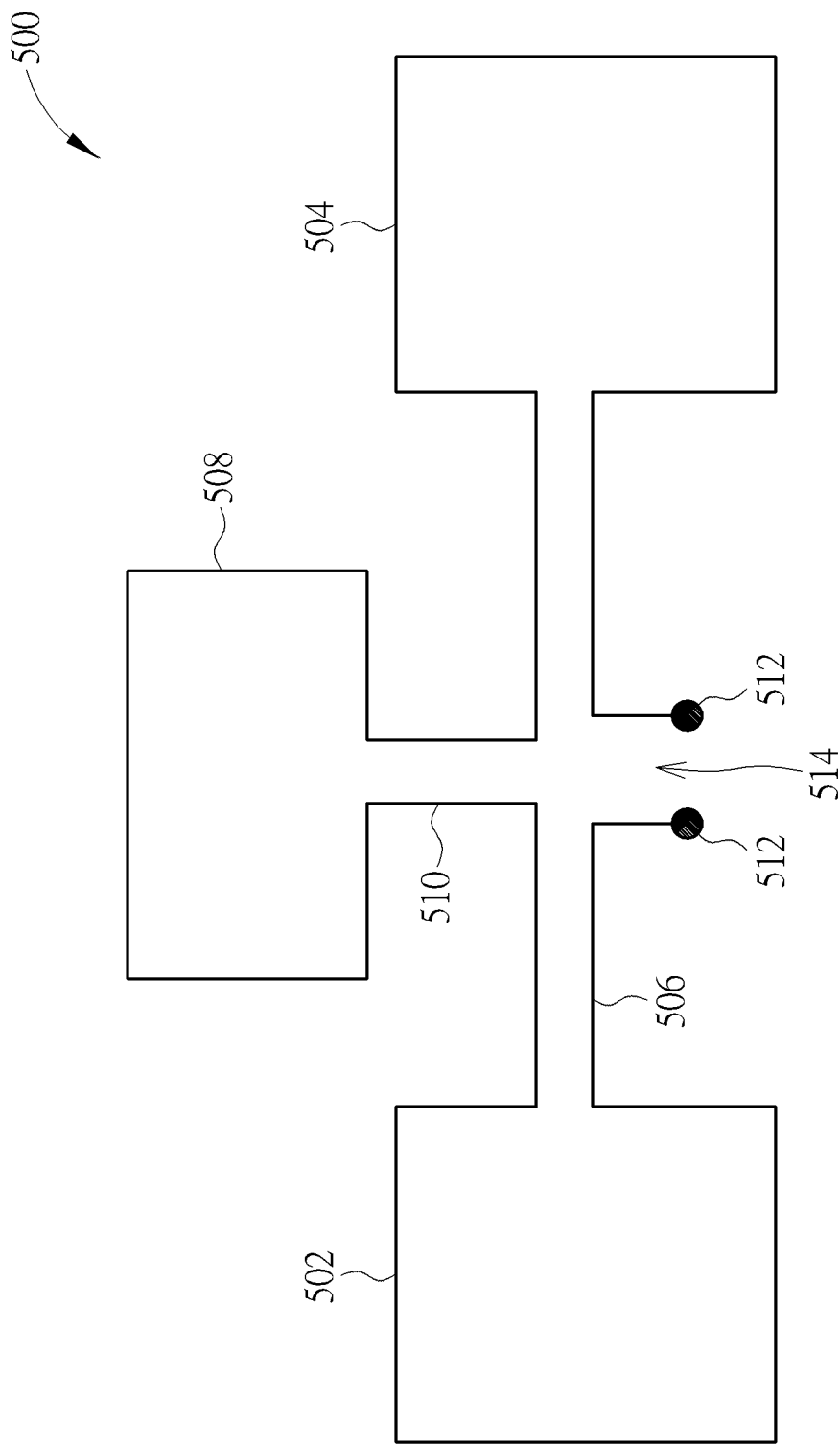
FIG. 5 is a simplified diagram of a polygon NFC antenna in accordance with a fourth embodiment of the present invention.

Please refer to FIG. 5. FIG. 5 is a simplified diagram of a polygon NFC antenna 500 in accordance with a fourth embodiment of the present invention. As shown in FIG. 5, the polygon NFC antenna 500 comprises: a first radiation part 502, a second radiation part 504, a third radiation part 506, a fourth radiation part 508, a fifth radiation part 510, and two antenna feed points 512, wherein the third radiation part 506 has an opening 514 coupled to the antenna feed points 512. The first radiation part 502 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle. In addition, please note that the above embodiment is only for an illustration purpose and are not meant to be a limitation of the present invention. For example, the antenna feed points 512 can be in any position of the first radiation part 502, the second radiation part 504, and the third radiation part 506, the fourth radiation part 508, and the fifth radiation part 510, and the opening 514 also can be in any position of the first radiation part 502, the second radiation part 504, and the third radiation part 506, the fourth radiation part 508, and the fifth radiation part 510.

The second radiation part 504 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 506 is coupled between the first radiation part 502 and the second radiation part 504, wherein the third radiation part 506 is arranged to have a parallel trace with single layer or multi-layer, a parallel wire routing with single layer or multi-layer. Please note that the rectangle is only for an illustration purpose and are not meant to be a limitation of the present invention. For example, the third radiation part 506 can be arranged to have a cross trace with single layer or multi-layer, a cross wire routing with single layer or multi-layer, a twisted trace with single layer or multi-layer, or a twisted wire routing with single layer or multi-layer.

The fourth radiation part 508 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a fourth pattern, wherein the fourth pattern is a rectangle in this embodiment. Please note that the rectangle is only for an illustration purpose and are not meant to be a limitation of the present invention. For example, the second pattern can be a square, an ellipse, or a circle.

The fifth radiation part 510 is coupled between the third radiation part 506 and the fourth radiation part 508, wherein the fifth radiation part 510 is arranged to have a parallel trace with single layer or multi-layer, a parallel wire routing with single layer or multi-layer. Please note that the rectangle is only for an illustration purpose and are not meant to be a limitation of the present invention. For example, the fifth radiation part 510 can be arranged to have a cross trace with single layer or multi-layer, a cross wire routing with single layer or multi-layer, a twisted trace with single layer or multi-layer, or a twisted wire routing with single layer or multi-layer. In addition, please note that the above embodiment is only for an illustration purpose and are not meant to be a limitation of the present invention. For example, the fifth radiation part 510 can be coupled between the first radiation part 502 and the fourth radiation part 508, or coupled between the second radiation part 504 and the fourth radiation part 508.

In addition, the polygon NFC 500 antenna can be formed by a PCB process, an FPCB process, or a copper wire process. The polygon NFC 500 antenna can be applied to a portable electronic device (such as a smartphone, a tablet, a laptop, or a handheld computing device), and the first radiation part 502, the second radiation part 504, the third radiation part 506, the fourth radiation part 508, and the fifth radiation part 510 can be positioned on different surfaces of the portable electronic device for multi-position detection in NFC.

Figure 6:
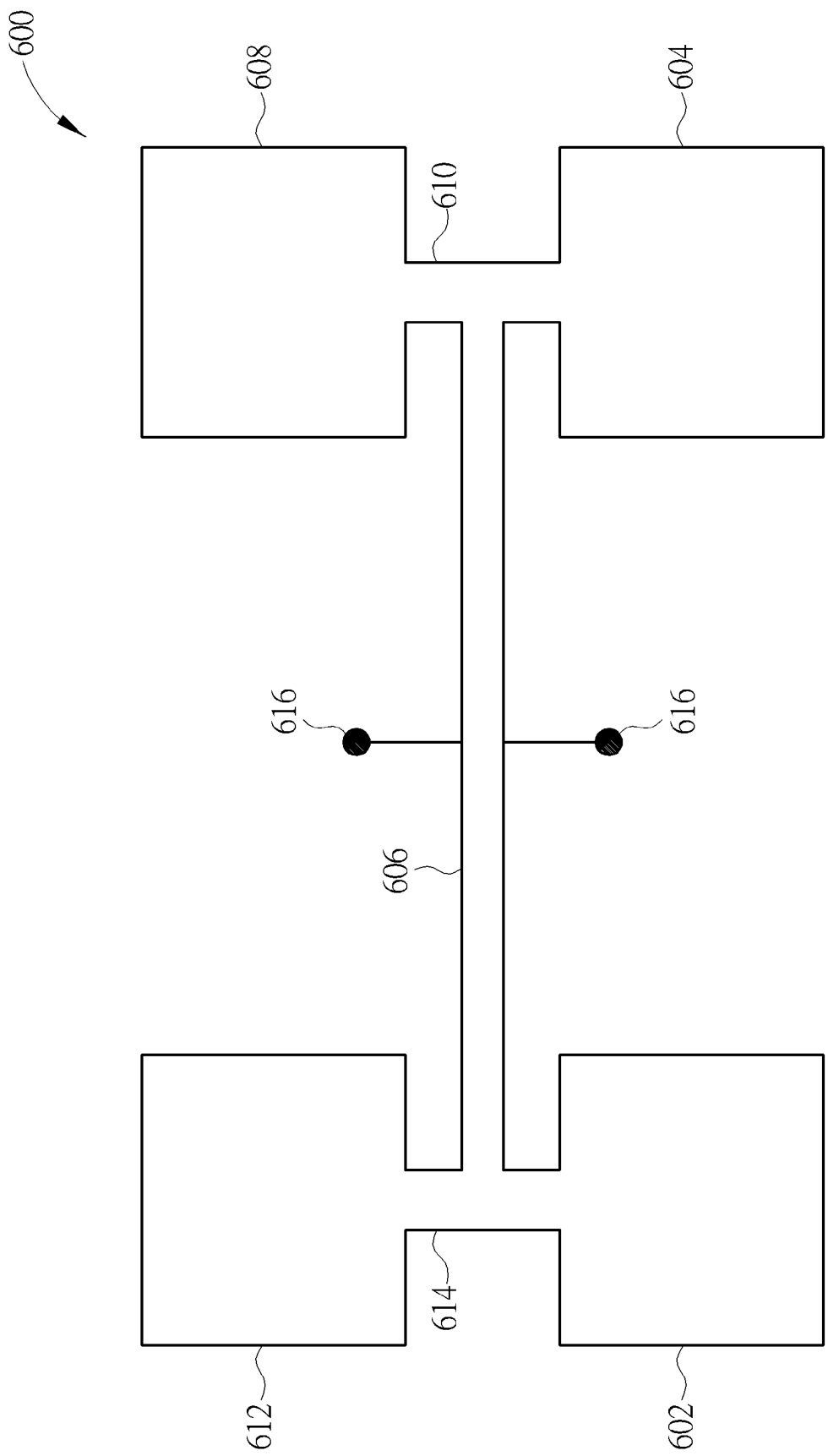
FIG. 6 is a simplified diagram of a polygon NFC antenna in accordance with a fifth embodiment of the present invention.

Please refer to FIG. 6. FIG. 6 is a simplified diagram of a polygon NFC antenna 600 in accordance with a fifth embodiment of the present invention. As shown in FIG. 6, the polygon NFC antenna 600 comprises: a first radiation part 602, a second radiation part 604, a third radiation part 606, a fourth radiation part 608, a fifth radiation part 610, a sixth radiation part 612, a seventh radiation part 614, and two antenna feed points 616, wherein the third radiation part 606 The first radiation part 602 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle. In addition, please note that the above embodiment is only for an illustration purpose and are not meant to be a limitation of the present invention. For example, the antenna feed points 612 can be in any position of the first radiation part 602, the second radiation part 604, and the third radiation part 606, the fourth radiation part 608, the fifth radiation part 610, the sixth radiation part 612, and the seventh radiation part 614.

The second radiation part 604 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 606 is coupled between the seventh radiation part 614 and the fifth radiation part 610, wherein the third radiation part 606 is arranged to have a parallel trace with single layer or multi-layer, a parallel wire routing with single layer or multi-layer. Please note that the rectangle is only for an illustration purpose and are not meant to be a limitation of the present invention. For example, the third radiation part 606 can be arranged to have a cross trace with single layer or multi-layer, a cross wire routing with single layer or multi-layer, a twisted trace with single layer or multi-layer, or a twisted wire routing with single layer or multi-layer. In addition, please note that the above embodiment is only for an illustration purpose and are not meant to be a limitation of the present invention. For example, the third radiation part 606 can be coupled between the first radiation part 602 and the second radiation part 604, or coupled between the fourth radiation part 608 and the sixth radiation part 612.

The fourth radiation part 608 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a fourth pattern, wherein the fourth pattern is a rectangle in this embodiment. Please note that the rectangle is only for an illustration purpose and are not meant to be a limitation of the present invention. For example, the second pattern can be a square, an ellipse, or a circle.

The fifth radiation part 610 is coupled between at least two of the second radiation part 604, the third radiation part 606, and the fourth radiation part 608, wherein the fifth radiation part 610 is arranged to have a parallel trace with single layer or multi-layer, a parallel wire routing with single layer or multi-layer. Please note that the rectangle is only for an illustration purpose and are not meant to be a limitation of the present invention. For example, the fifth radiation part 610 can be arranged to have a cross trace with single layer or multi-layer, a cross wire routing with single layer or multi-layer, a twisted trace with single layer or multi-layer, or a twisted wire routing with single layer or multi-layer.

The sixth radiation part 612 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a sixth pattern, wherein the sixth pattern is a rectangle in this embodiment. Please note that the rectangle is only for an illustration purpose and are not meant to be a limitation of the present invention. For example, the second pattern can be a square, an ellipse, or a circle.

The seventh radiation part 614 is coupled between at least two of the first radiation part 602, the third radiation part 606, and the sixth radiation part 612, wherein the seventh radiation part 614 is arranged to have a parallel trace with single layer or multi-layer, a parallel wire routing with single layer or multi-layer. Please note that the rectangle is only for an illustration purpose and are not meant to be a limitation of the present invention. For example, the seventh radiation part 614 can be arranged to have a cross trace with single layer or multi-layer, a cross wire routing with single layer or multi-layer, a twisted trace with single layer or multi-layer, or a twisted wire routing with single layer or multi-layer.

In addition, the polygon NFC 600 antenna can be formed by a PCB process, an FPCB process, or a copper wire process. The polygon NFC 600 antenna can be applied to a portable electronic device (such as a smartphone, a tablet, a laptop, or a handheld computing device), and the first radiation part 602, the second radiation part 604, the third radiation part 606, the fourth radiation part 608, the fifth radiation part 610, the sixth radiation part 612, and the seventh radiation part 614 can be positioned on different surfaces of the portable electronic device for multi-position detection in NFC.

Figure 7:
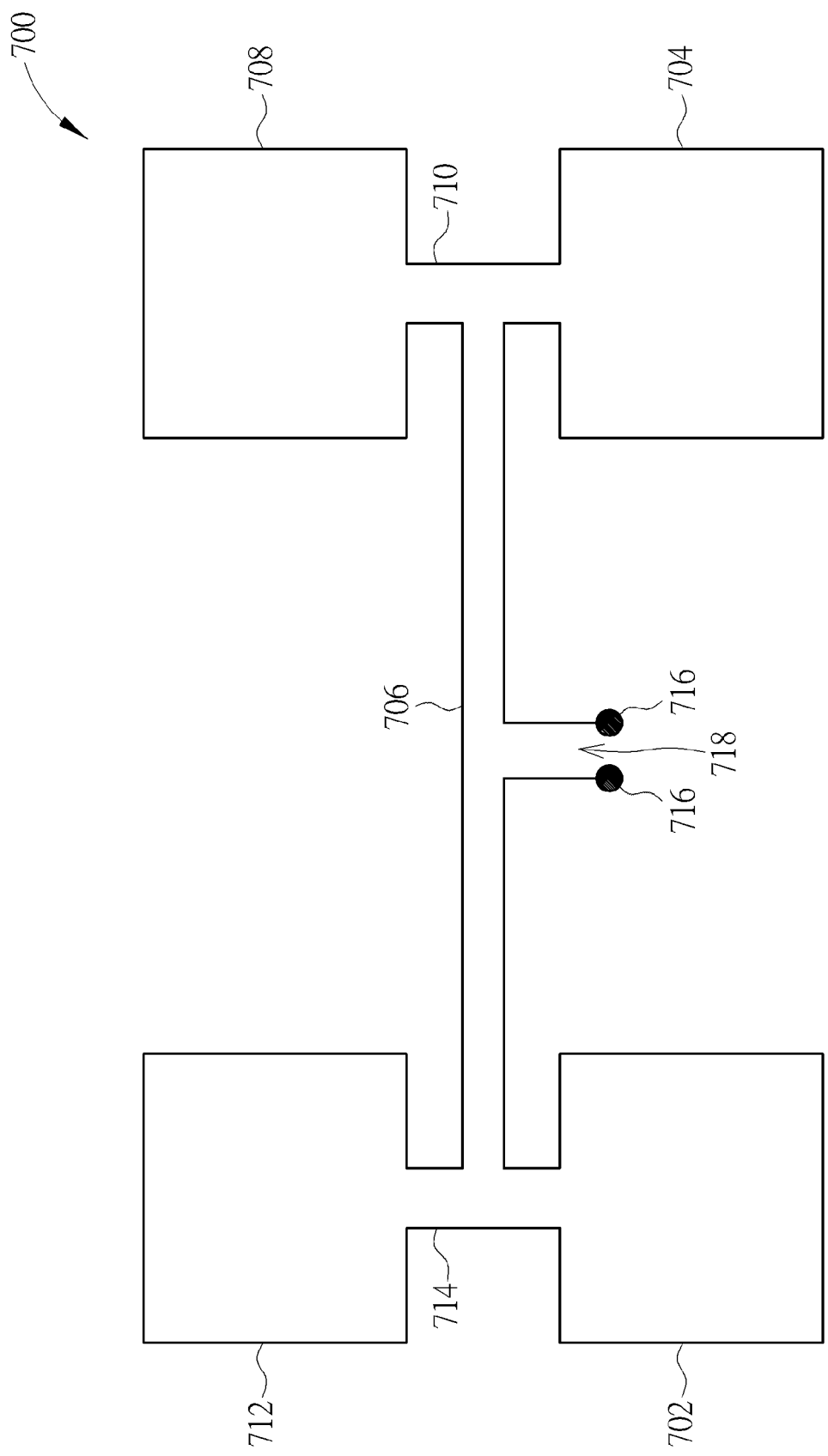
FIG. 7 is a simplified diagram of a polygon NFC antenna in accordance with a sixth embodiment of the present invention.

Please refer to FIG. 7. FIG. 7 is a simplified diagram of a polygon NFC antenna 700 in accordance with a sixth embodiment of the present invention. As shown in FIG. 7, the polygon NFC antenna 700 comprises: a first radiation part 702, a second radiation part 704, a third radiation part 706, a fourth radiation part 708, a fifth radiation part 710, a sixth radiation part 712, a seventh radiation part 714, and two antenna feed points 716, wherein the third radiation part 706 has an opening 718 couple to the antenna feed points 716. The first radiation part 702 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern, wherein the first pattern is a rectangle in this embodiment. Please note that the rectangle is only for an illustration purpose and are not meant to be a limitation of the present invention. For example, the first pattern can be a square, an ellipse, or a circle. In addition, please note that the above embodiment is only for an illustration purpose and are not meant to be a limitation of the present invention. For example, the antenna feed points 712 can be in any position of the first radiation part 702, the second radiation part 704, and the third radiation part 706, the fourth radiation part 708, the fifth radiation part 710, the sixth radiation part 712, and the seventh radiation part 714, and the opening 718 also can be in any position of the first radiation part 702, the second radiation part 704, and the third radiation part 706, the fourth radiation part 708, the fifth radiation part 710, the sixth radiation part 712, and the seventh radiation part 714.

The second radiation part 704 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern, wherein the second pattern is a rectangle in this embodiment. Please note that the rectangle is only for an illustration purpose and are not meant to be a limitation of the present invention. For example, the second pattern can be a square, an ellipse, or a circle.

The third radiation part 706 is coupled between the first radiation part 702 and the second radiation part 702, wherein the third radiation part 706 is arranged to have a parallel trace with single layer or multi-layer, a parallel wire routing with single layer or multi-layer. Please note that the rectangle is only for an illustration purpose and are not meant to be a limitation of the present invention. For example, the third radiation part 706 can be arranged to have a cross trace with single layer or multi-layer, a cross wire routing with single layer or multi-layer, a twisted trace with single layer or multi-layer, or a twisted wire routing with single layer or multi-layer.

The fourth radiation part 708 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a fourth pattern, wherein the fourth pattern is a rectangle in this embodiment. Please note that the rectangle is only for an illustration purpose and are not meant to be a limitation of the present invention. For example, the second pattern can be a square, an ellipse, or a circle.

The fifth radiation part 710 is coupled between at least two of the second radiation part 704, the third radiation part 706, and the fourth radiation part 708, wherein the fifth radiation part 710 is arranged to have a parallel trace with single layer or multi-layer, a parallel wire routing with single layer or multi-layer. Please note that the rectangle is only for an illustration purpose and are not meant to be a limitation of the present invention. For example, the fifth radiation part 710 can be arranged to have a cross trace with single layer or multi-layer, a cross wire routing with single layer or multi-layer, a twisted trace with single layer or multi-layer, or a twisted wire routing with single layer or multi-layer.

The sixth radiation part 712 is arranged to have a single turn trace with single layer or multi-layer, a single turn wire routing with single layer or multi-layer, a multi-turns trace with single layer or multi-layer, or a multi-turns wire routing with single layer or multi-layer, and formed to have a sixth pattern, wherein the sixth pattern is a rectangle in this embodiment. Please note that the rectangle is only for an illustration purpose and are not meant to be a limitation of the present invention. For example, the second pattern can be a square, an ellipse, or a circle.

The seventh radiation part 714 is coupled between at least two of the first radiation part 702, the third radiation part 706, and the sixth radiation part 712, wherein the seventh radiation part 714 is arranged to have a parallel trace with single layer or multi-layer, a parallel wire routing with single layer or multi-layer. Please note that the rectangle is only for an illustration purpose and are not meant to be a limitation of the present invention. For example, the seventh radiation part 714 can be arranged to have a cross trace with single layer or multi-layer, a cross wire routing with single layer or multi-layer, a twisted trace with single layer or multi-layer, or a twisted wire routing with single layer or multi-layer.

In addition, the polygon NFC 700 antenna can be formed by a PCB process, an FPCB process, or a copper wire process. The polygon NFC 700 antenna can be applied to a portable electronic device (such as a smartphone, a tablet, a laptop, or a handheld computing device), and the first radiation part 702, the second radiation part 704, the third radiation part 706, the fourth radiation part 708, the fifth radiation part 710, the sixth radiation part 712, and the seventh radiation part 714 can be positioned on different surfaces of the portable electronic device for multi-position detection in NFC.

Above are some examples for polygon NFC antenna. The application could be appeared with more radiation parts which is not listed in above example. But the polygon concept could apply more example if more application part needed.

Figure 8:
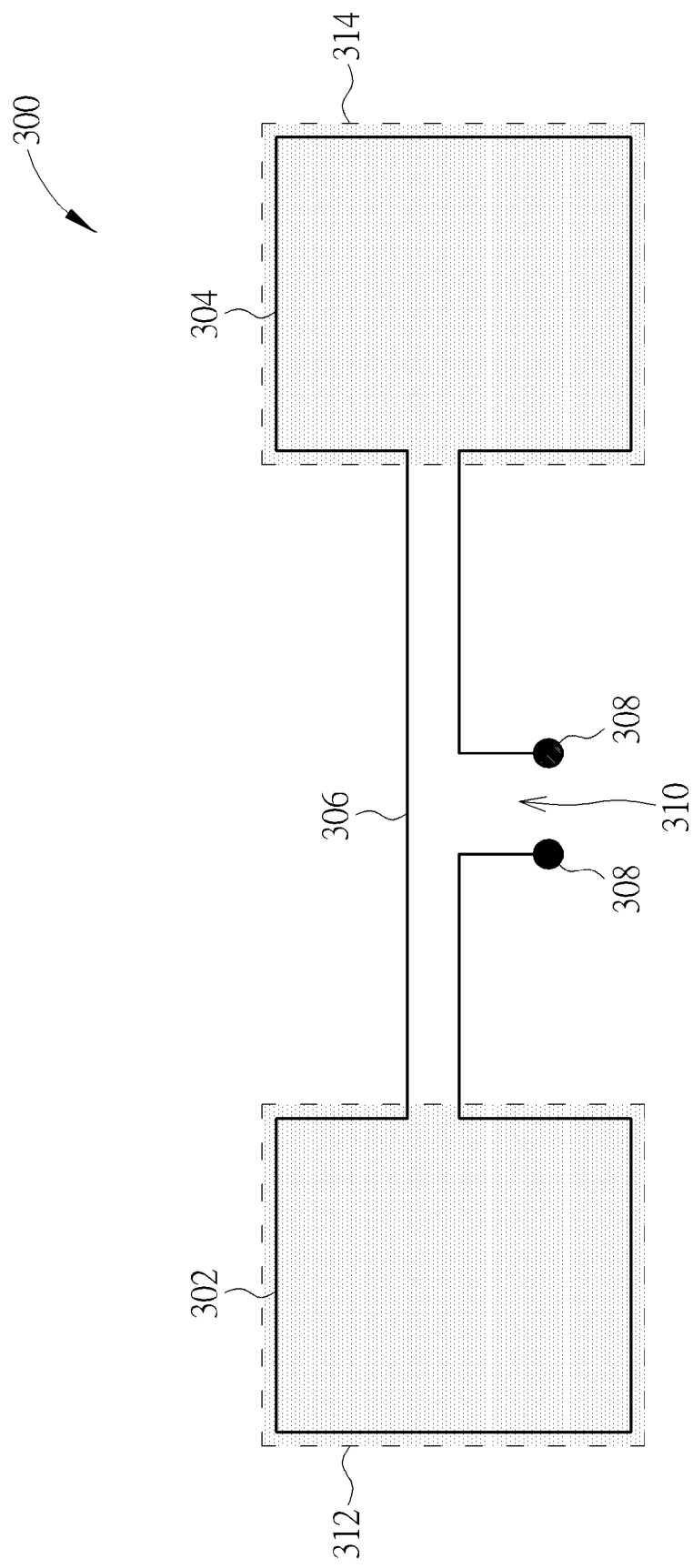
FIG. 8 is simplified diagram of the polygon NFC antenna in FIG. 3 comprising the ferrite sheet.
Figure 9:
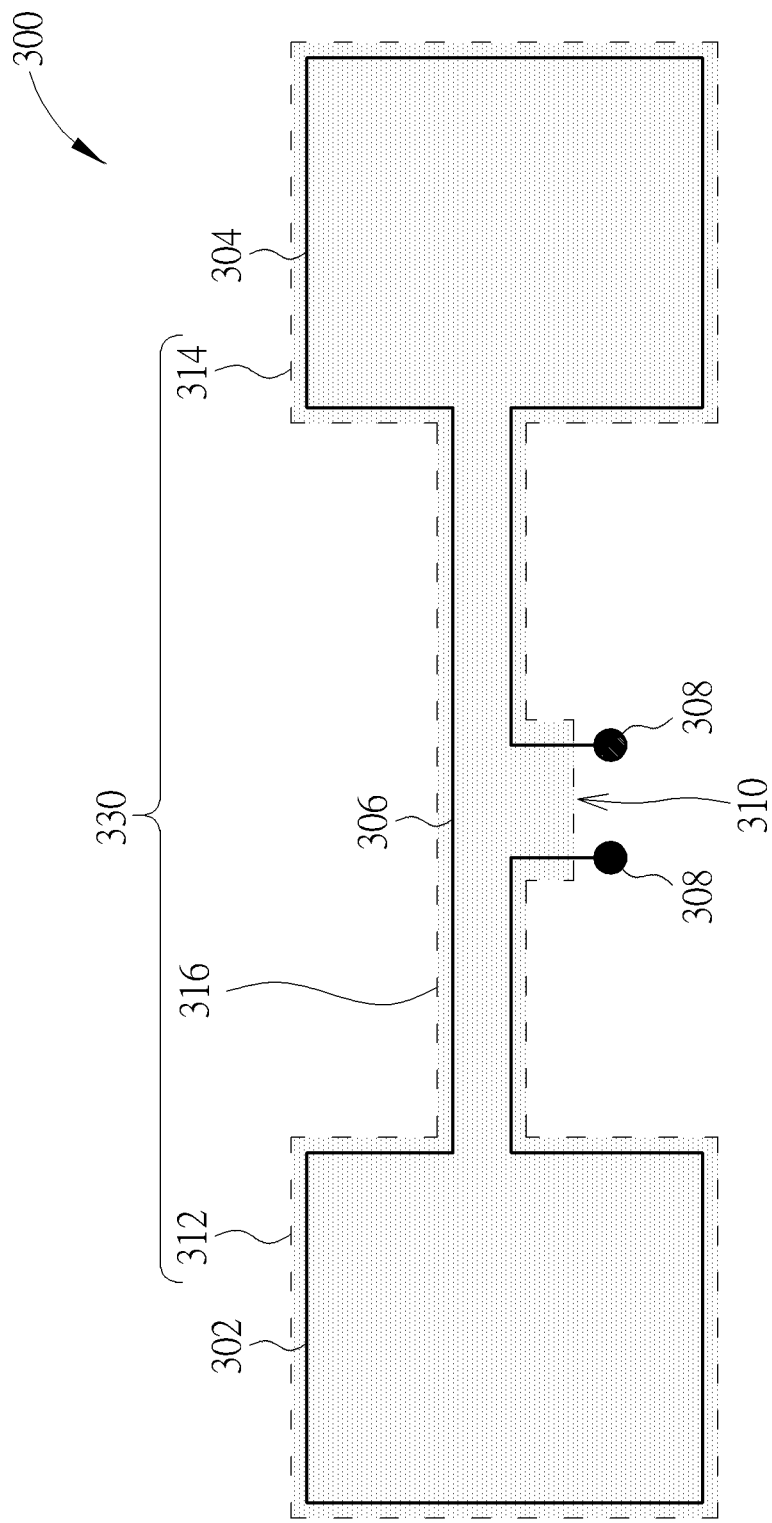
FIG. 9 is simplified diagram of the polygon NFC antenna in FIG. 3 comprising the ferrite sheet.
Figure 10:
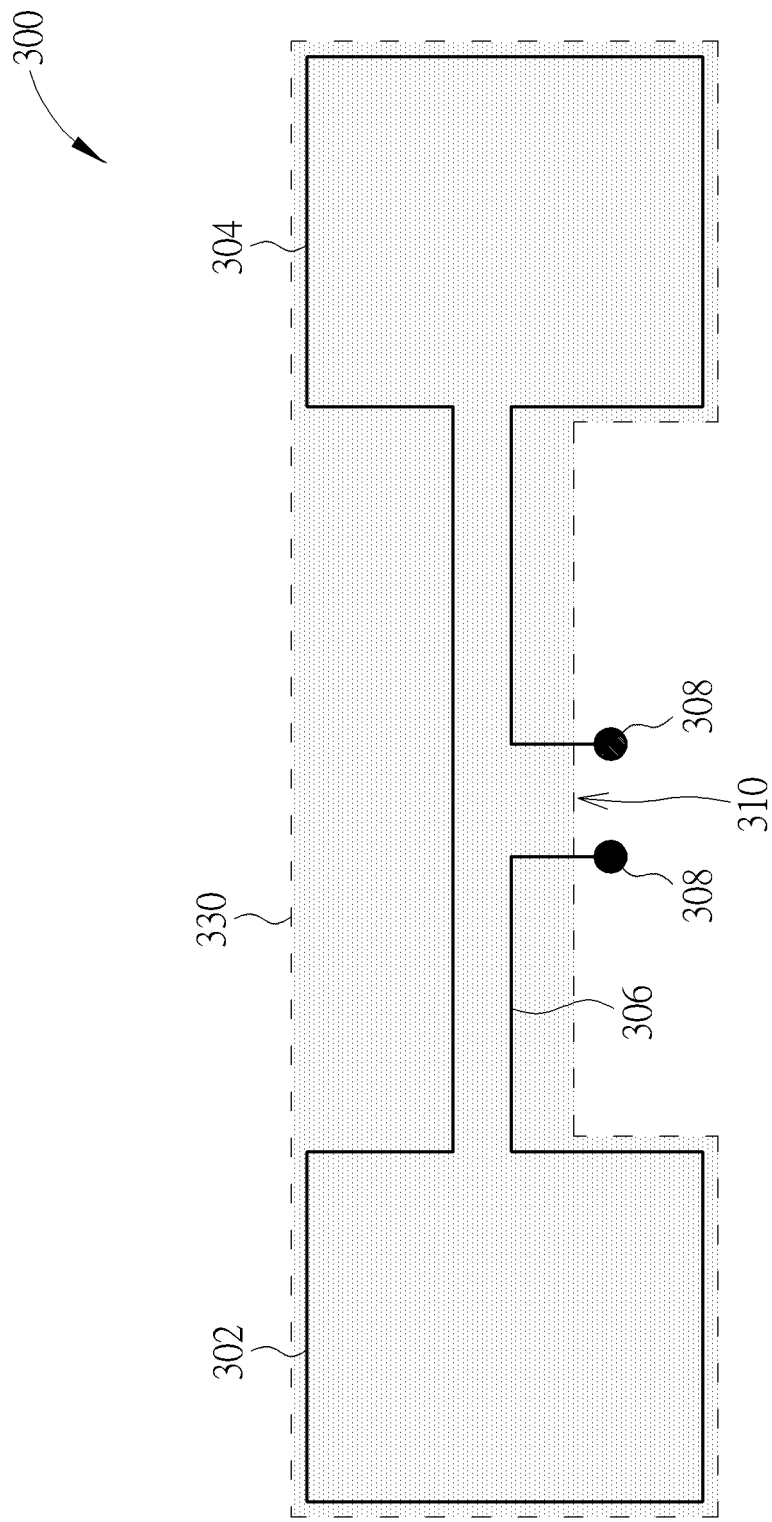
FIG. 10 is simplified diagram of the polygon NFC antenna in FIG. 3 comprising the ferrite sheet.

Furthermore, the polygon NFC antennas in the above embodiments can further comprise at least a ferrite sheet. For example, please refer to FIG. 8, FIG. 9, and FIG. 10. FIG. 8, FIG. 9, and FIG. 10 are simplified diagrams of the polygon NFC antenna 300 comprising the ferrite sheet. As shown in FIG. 8, the polygon NFC antenna 300 can further comprise a first ferrite sheet 312 and a second ferrite sheet 314, wherein the first ferrite sheet 312 is formed overlap the first radiation part 302, and the second ferrite sheet 314 is formed overlap the second radiation part 304. As shown in FIG. 9, the polygon NFC antenna 300 can further comprise a first ferrite sheet 312, a second ferrite sheet 314, and a third ferrite sheet 316. The first ferrite sheet 312 is formed overlap the first radiation part 302, and the second ferrite sheet 314 is formed overlap the second radiation part 304, and the third ferrite sheet 316 is formed overlap the third radiation part 306, wherein the first ferrite sheet 312, the second ferrite sheet 314, and the third ferrite sheet 316 can be integrated into a single ferrite sheet 330. Please note that the pattern of the single ferrite sheet 330 in FIG. 9 is only for an illustration purpose and are not meant to be a limitation of the present invention. For example, the single ferrite sheet can have a different pattern according to different design requirement, as shown in FIG. 10.

Figure 11:
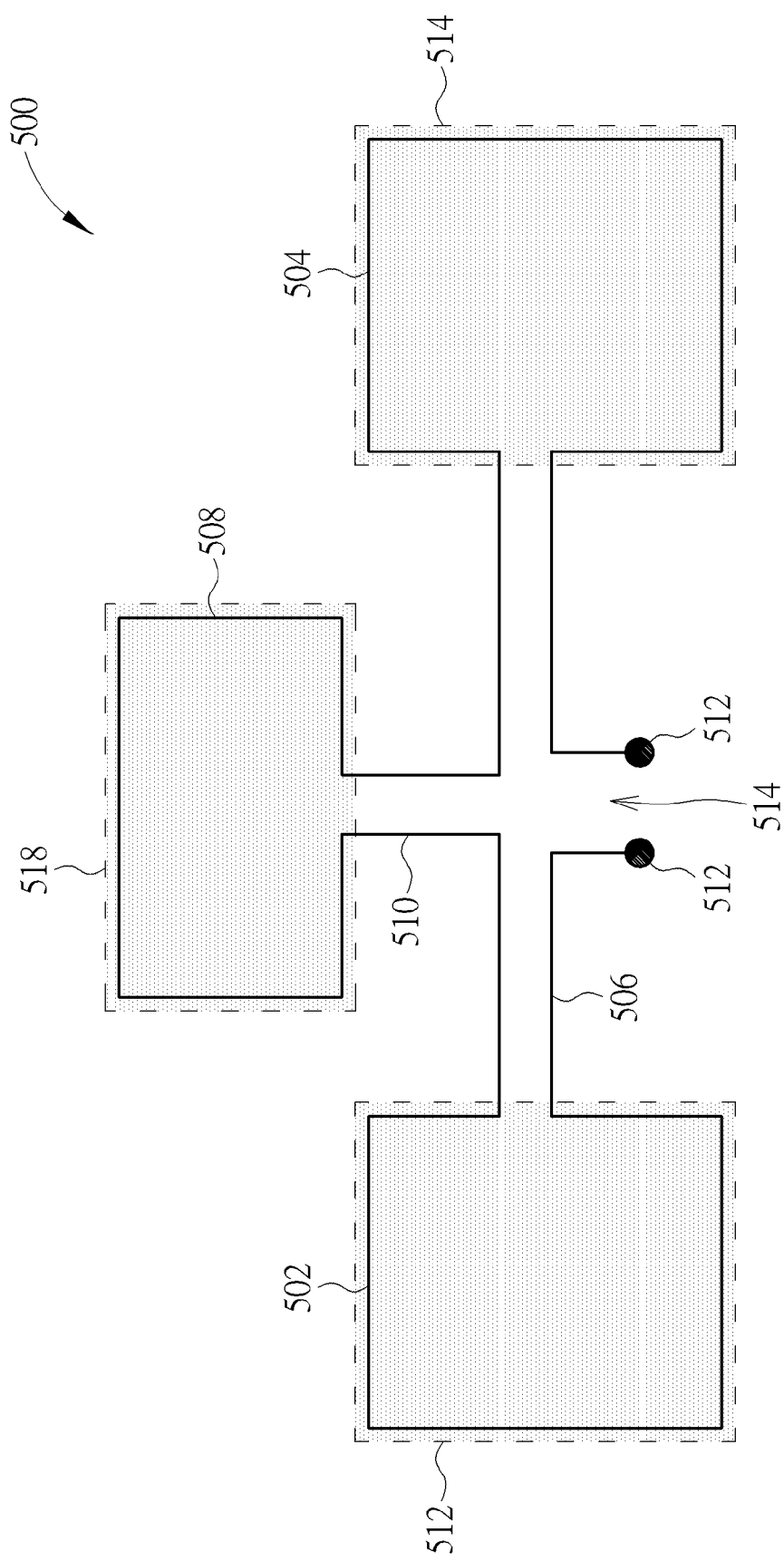
FIG. 11 is simplified diagram of the polygon NFC antenna FIG. 5 comprising the ferrite sheet.
Figure 12:
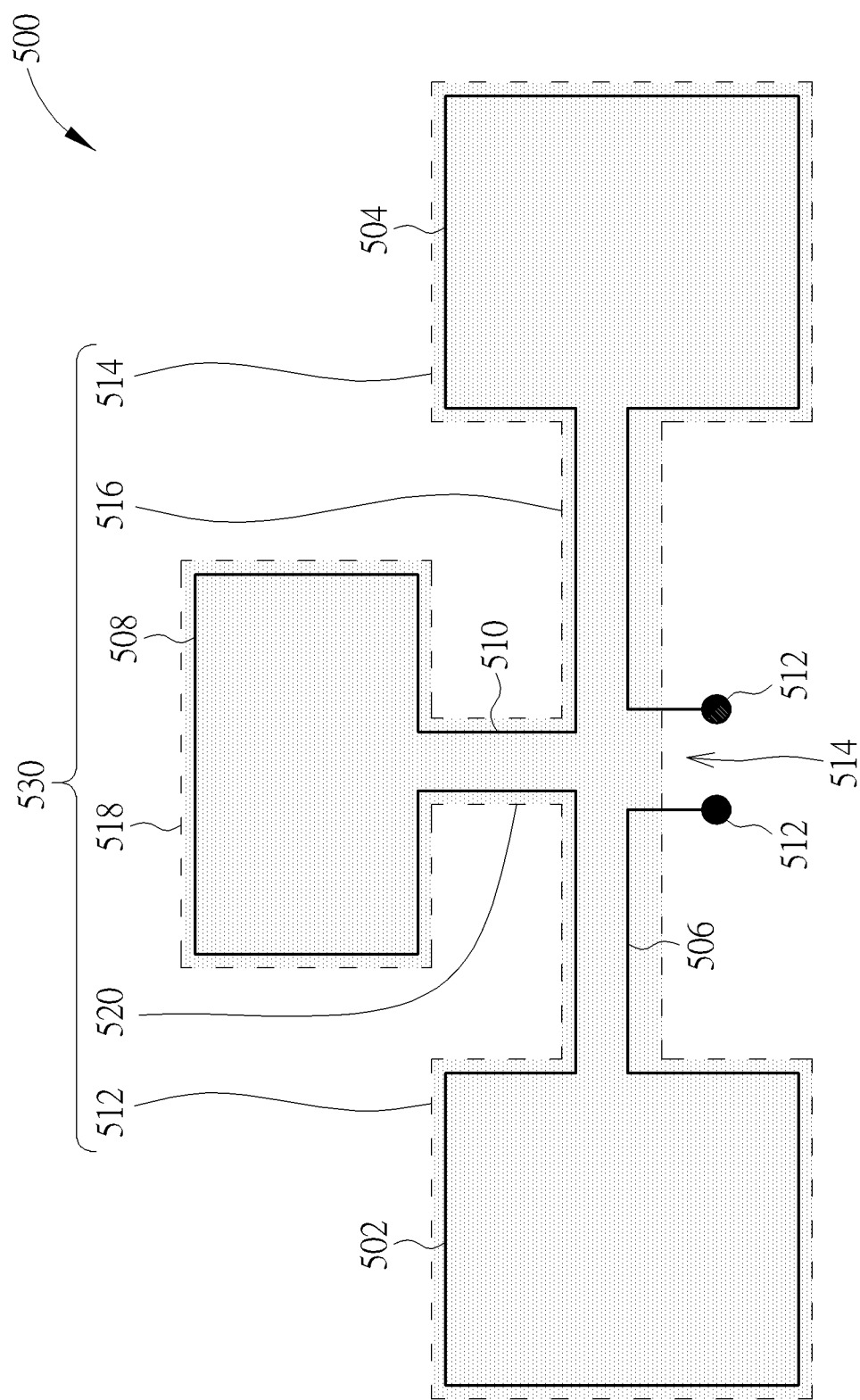
FIG. 12 is simplified diagram of the polygon NFC antenna FIG. 5 comprising the ferrite sheet.
Figure 13:
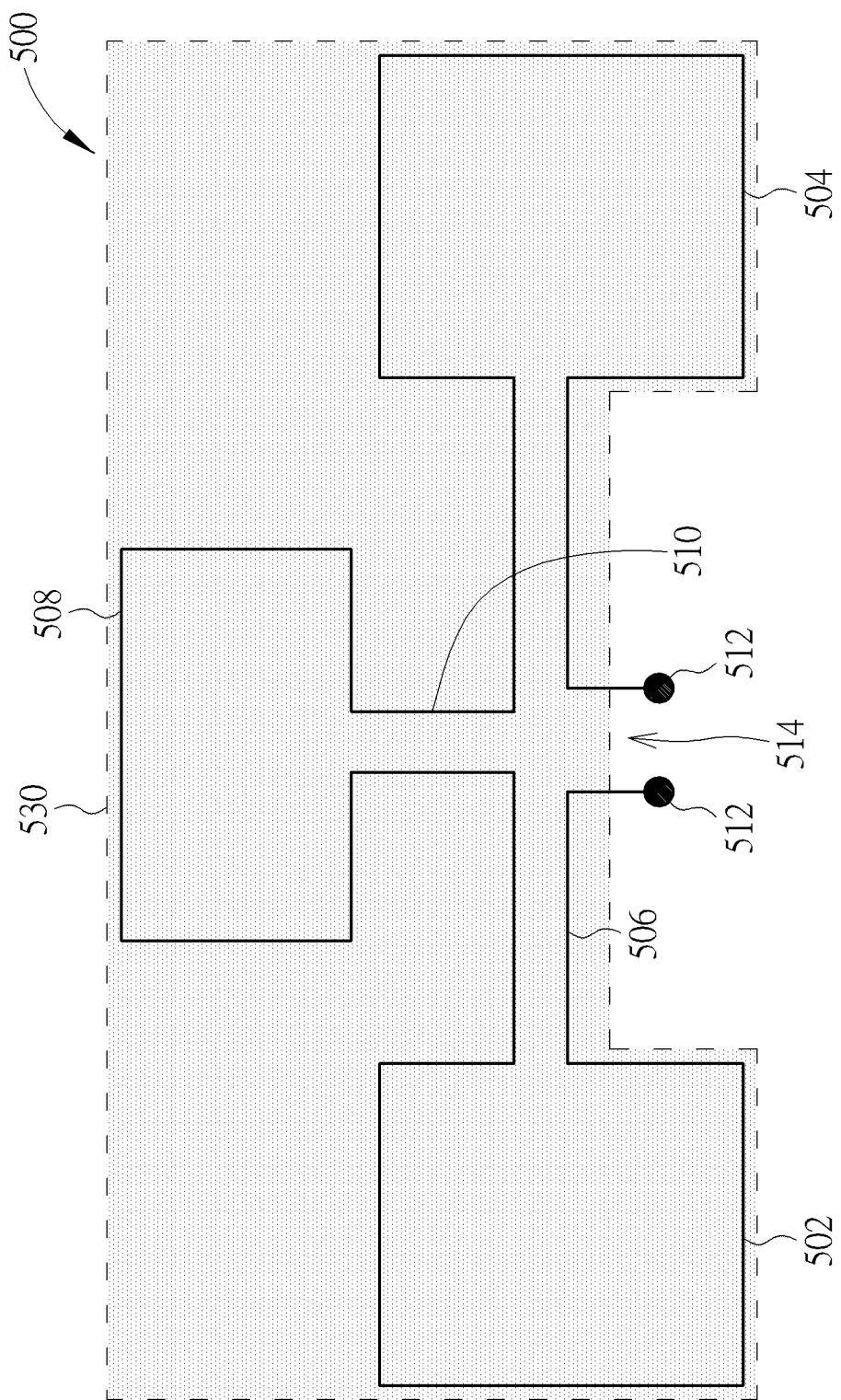
FIG. 13 is simplified diagram of the polygon NFC antenna FIG. 5 comprising the ferrite sheet.

Please refer to FIG. 11, FIG. 12, and FIG. 13. FIG. 11, FIG. 12, and FIG. 13 are simplified diagrams of the polygon NFC antenna 500 comprising the ferrite sheet. As shown in FIG. 11, the polygon NFC antenna 500 can further comprise a first ferrite sheet 512 and a second ferrite sheet 514, and a fourth ferrite sheet 518, wherein the first ferrite sheet 512 is formed overlap the first radiation part 502, the second ferrite sheet 514 is formed overlap the second radiation part 504, and the fourth ferrite sheet 518 is formed overlap the fourth radiation part 508. As shown in FIG. 12, the polygon NFC antenna 500 can further comprise a first ferrite sheet 512, a second ferrite sheet 514, a third ferrite sheet 516, a fourth ferrite sheet 518, and a fifth ferrite sheet 520. The first ferrite sheet 512 is formed overlap the first radiation part 502, and the second ferrite sheet 514 is formed overlap the second radiation part 504, and the third ferrite sheet 516 is formed overlap the third radiation part 506, and the fourth ferrite sheet 518 is formed overlap the fourth radiation part 508, and the fifth ferrite sheet 520 is formed overlap the fifth radiation part 510, wherein the first ferrite sheet 512, the second ferrite sheet 514, the third ferrite sheet 516, the fourth ferrite sheet 518, and the fifth ferrite sheet 520 can be integrated into a single ferrite sheet 530. Please note that the pattern of the single ferrite sheet 530 in FIG. 12 is only for an illustration purpose and are not meant to be a limitation of the present invention. For example, the single ferrite sheet 530 can have a different pattern according to different design requirement, as shown in FIG. 13.

Figure 14:
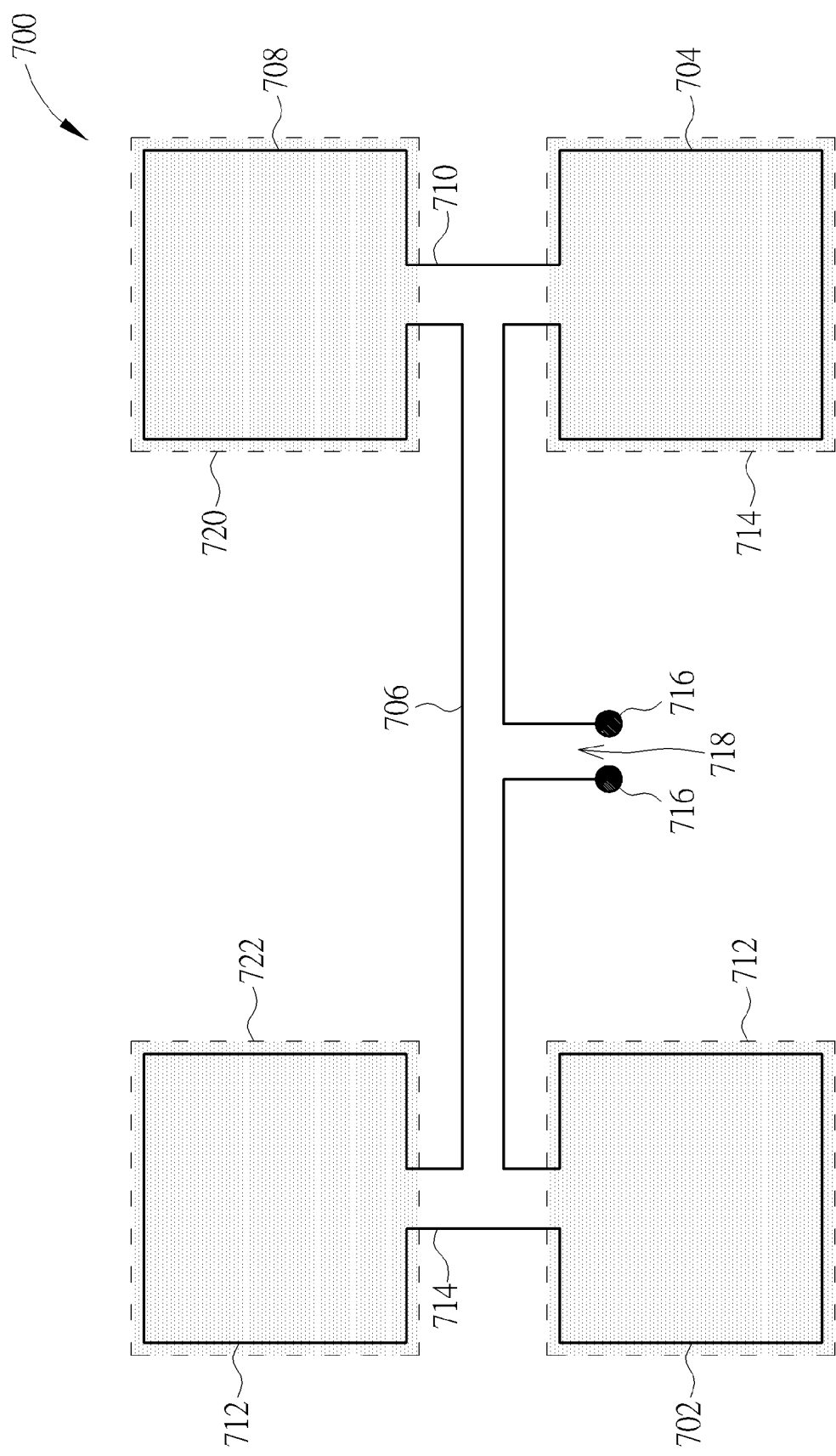
FIG. 14 is a simplified diagram of the polygon NFC antenna FIG. 7 comprising the ferrite sheet.
Figure 15:
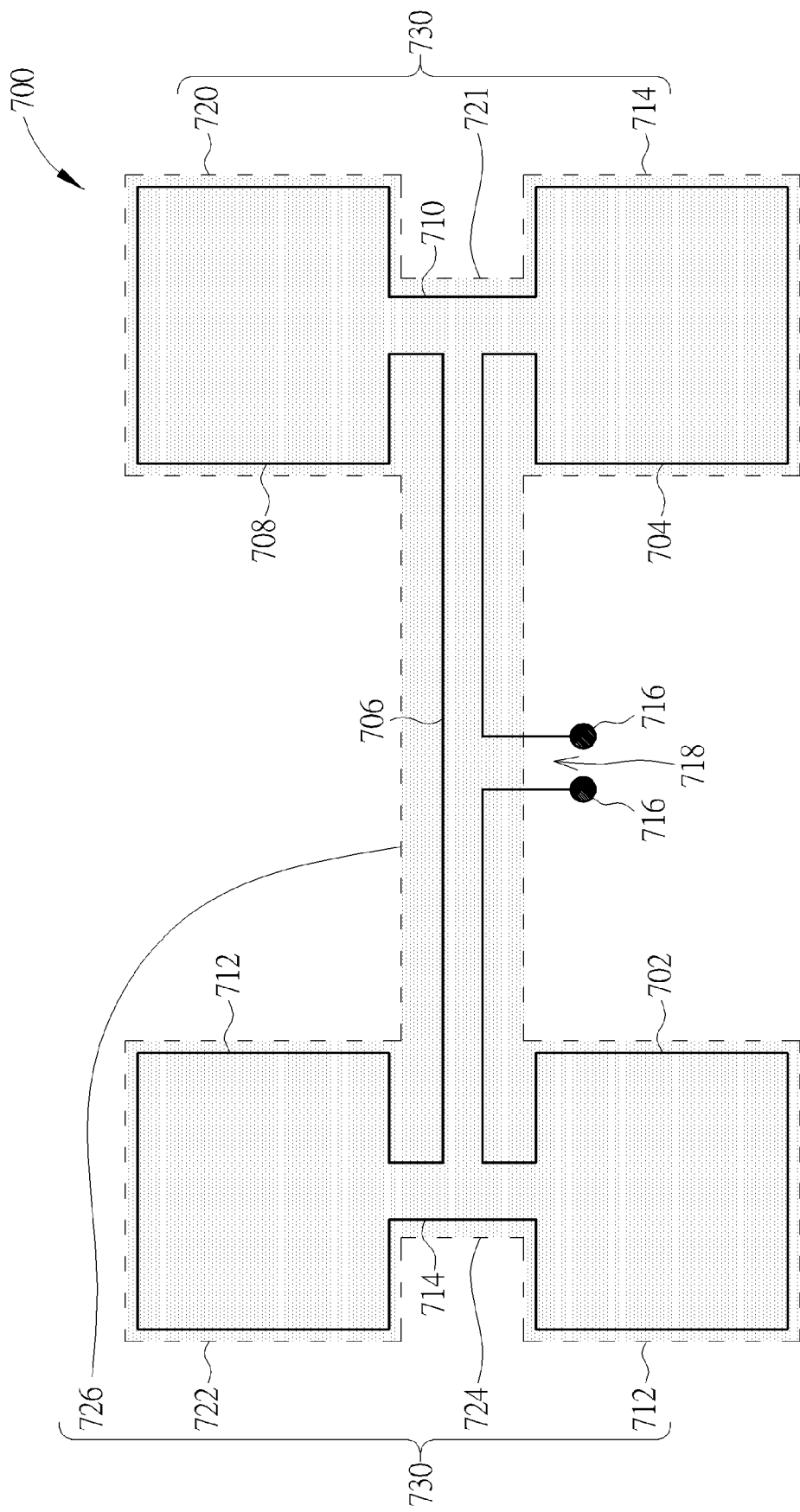
FIG. 15 is a simplified diagram of the polygon NFC antenna FIG. 7 comprising the ferrite sheet.
Figure 16:
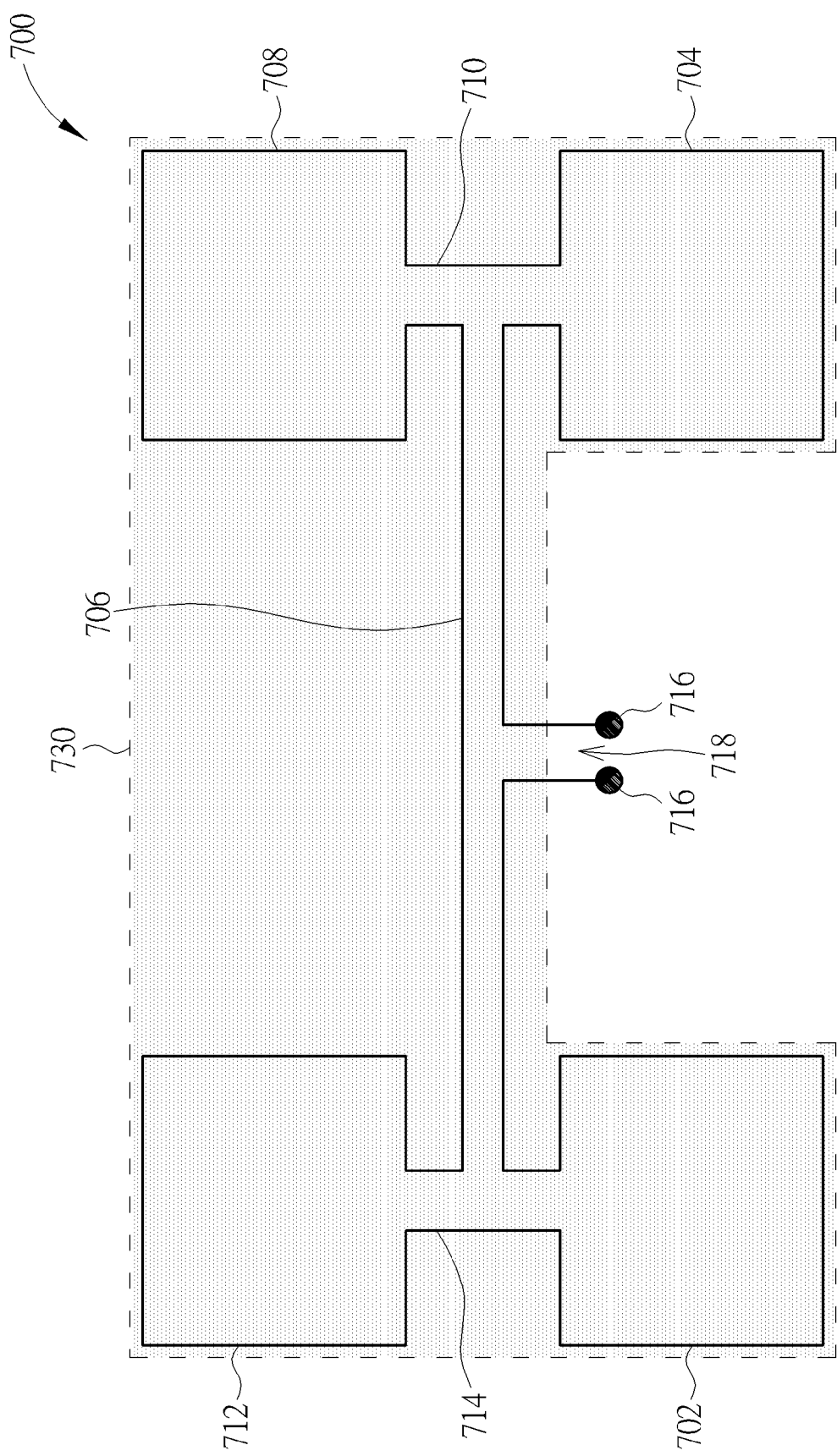
FIG. 16 is a simplified diagram of the polygon NFC antenna FIG. 7 comprising the ferrite sheet.

Please refer to FIG. 14, FIG. 15, and FIG. 16. FIG. 14, FIG. 15, and FIG. 16 are simplified diagrams of the polygon NFC antenna 700 comprising the ferrite sheet. As shown in FIG. 14, the polygon NFC antenna 700 can further comprise a first ferrite sheet 712 and a second ferrite sheet 714, a fourth ferrite sheet 720, and a sixth ferrite sheet 722, wherein the first ferrite sheet 712 is formed overlap the first radiation part 702, the second ferrite sheet 714 is formed overlap the second radiation part 704, the fourth ferrite sheet 720 is formed overlap the fourth radiation part 708, and the sixth ferrite sheet 722 is formed overlap the sixth radiation part 712. As shown in FIG. 15, the polygon NFC antenna 700 can further comprise a first ferrite sheet 712, a second ferrite sheet 714, a third ferrite sheet 726, a fourth ferrite sheet 720, a fifth ferrite sheet 721, a sixth ferrite sheet 722, and a seventh ferrite sheet 724. The first ferrite sheet 712 is formed overlap the first radiation part 702, and the second ferrite sheet 714 is formed overlap the second radiation part 704, and the third ferrite sheet 716 is formed overlap the third radiation part 706, and the fourth ferrite sheet 720 is formed overlap the fourth radiation part 708, and the fifth ferrite sheet 721 is formed overlap the fifth radiation part 710, and the sixth ferrite sheet 722 is formed overlap the sixth radiation part 712, and the seventh ferrite sheet 724 is formed overlap the seventh radiation part 714, wherein the first ferrite sheet 712, the second ferrite sheet 714, the third ferrite sheet 726, the fourth ferrite sheet 720, the fifth ferrite sheet 721, the sixth ferrite sheet 722, and the seventh ferrite sheet 724 can be integrated into a single ferrite sheet 730. Please note that the pattern of the single ferrite sheet 730 in FIG. 15 is only for an illustration purpose and are not meant to be a limitation of the present invention. For example, the single ferrite sheet 730 can have a different pattern according to different design requirement, as shown in FIG. 16.

Figure 17:
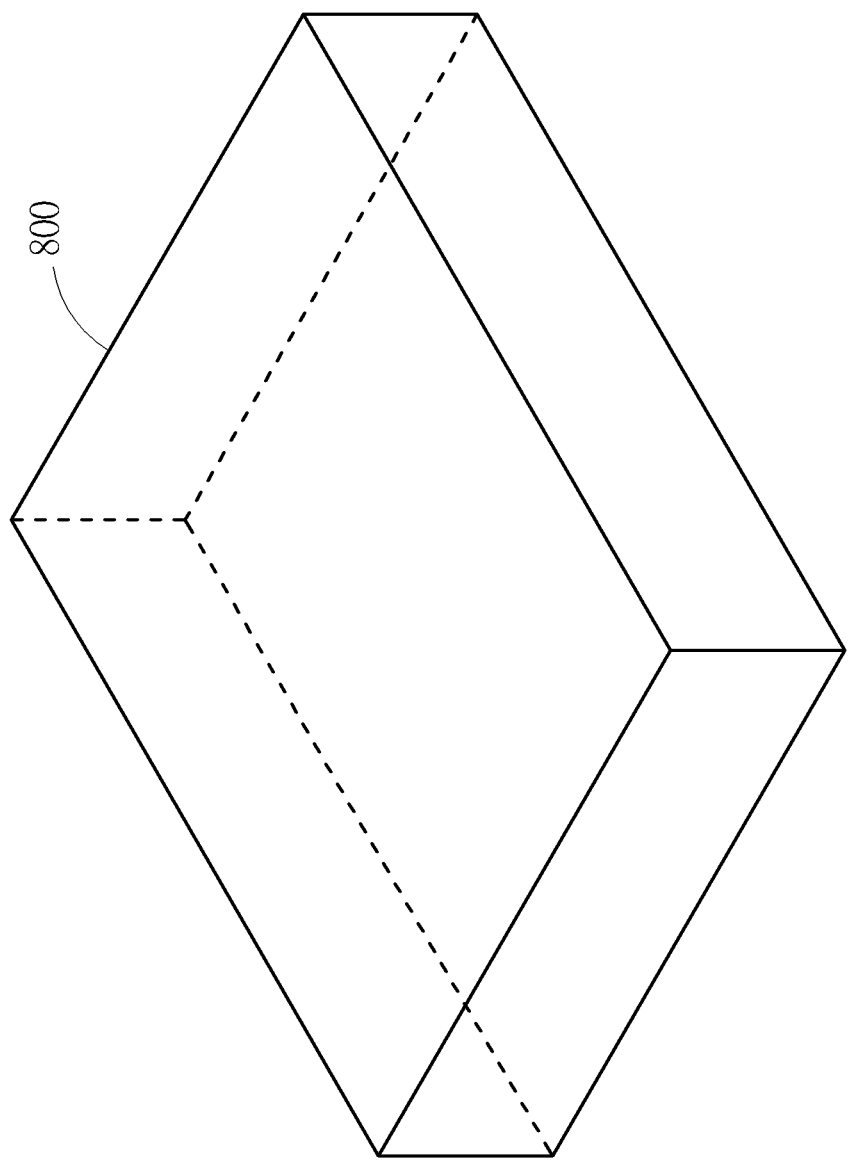
FIG. 17 is a simplified diagram of a chip antenna in accordance with an embodiment of the present invention.

Please refer to FIG. 17. FIG. 17 is a simplified diagram of a chip antenna 800 in accordance with an embodiment of the present invention, wherein the chip antenna 800 can be SMT or solder on PCB or FPCB for portable devices, digital home products, or IOT device applications, and the chip antenna also can be implant in a SIM card, a micro SD card, or a back cover of portable device. As shown in FIG. 17, the chip antenna 800 has six surfaces, and the polygon NFC antennas in the above embodiments can be located on each surface or several surfaces of the chip antenna 800 or inside the chip antenna 800.

Briefly summarized, the polygon NFC antenna disclosed by the present invention can be applied to a portable electronic device (such as a smartphone, a tablet, a laptop, or a handheld computing device) for multi-position detection in NFC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A polygon Near Field Communication (NFC) antenna, comprising:
    a first radiation part, arranged to have a single turn trace with single layer or multi-layer, a single turn wire routing with single layer or multi-layer, a multi-turns trace with single layer or multi-layer, or a multi-turns wire routing with single layer or multi-layer, and formed to have a first pattern;
    a second radiation part, arranged to have a single turn trace with single layer or multi-layer, a single turn wire routing with single layer or multi-layer, a multi-turns trace with single layer or multi-layer, or a multi-turns wire routing with single layer or multi-layer, and formed to have a second pattern;
    a third radiation part, coupled between the first radiation part and the second radiation part; and
    at least an antenna feed point, coupled to either the first, the second, or the third radiation part.

2. The polygon NFC antenna of claim 1, further comprising:
    a fourth radiation part, arranged to have a single turn trace with single layer or multi-layer, a single turn wire routing with single layer or multi-layer, a multi-turns trace with single layer or multi-layer, or a multi-turns wire routing with single layer or multi-layer, and formed to have a fourth pattern; and
    a fifth radiation part, coupled between at least two of the third radiation part, the fourth radiation part, and second radiation part.

3. The polygon NFC antenna of claim 2, further comprising:
    a sixth radiation part, arranged to have a single turn trace with single layer or multi-layer, a single turn wire routing with single layer or multi-layer, a multi-turns trace with single layer or multi-layer, or a multi-turns wire routing with single layer or multi-layer, and formed to have a sixth pattern; and
    a seventh radiation part, coupled between at least two of the third radiation part, the sixth radiation part, and first radiation part.

4. The polygon NFC antenna of claim 3, wherein the sixth pattern is a square, a rectangle, an ellipse, or a circle.

5. The polygon NFC antenna of claim 3, wherein the seventh radiation part is arranged to have a parallel trace with single layer or multi-layer, a parallel wire routing with single layer or multi-layer, a cross trace with single layer or multi-layer, a cross wire routing with single layer or multi-layer, a twisted trace with single layer or multi-layer, or a twisted wire routing with single layer or multi-layer.

6. The polygon NFC antenna of claim 3, wherein the polygon NFC antenna is applied to a portable electronic device, and the first radiation part, the second radiation part, the third radiation part, the fourth radiation part, the fifth radiation part, the sixth radiation part, and the seventh radiation part are positioned on different surfaces of the portable electronic device for multi-position detection in NFC.

7. The polygon NFC antenna of claim 3, further comprising:
a first ferrite sheet, formed overlap the first radiation part;
a second ferrite sheet, formed overlap the second radiation part;
a fourth ferrite sheet, formed overlap the fourth radiation part; and
a sixth ferrite sheet, formed overlap the sixth radiation part.

8. The polygon NFC antenna of claim 7, further comprising:
a third ferrite sheet, formed overlap the third radiation part;
a fifth ferrite sheet, formed overlap the fifth radiation part; and
a seventh ferrite sheet, formed overlap the seventh radiation part.

9. The polygon NFC antenna of claim 8, wherein the first ferrite sheet, the second ferrite sheet, the third ferrite sheet, the fourth ferrite sheet, the fifth ferrite sheet, the sixth ferrite sheet, and the seventh ferrite sheet are integrated into a single ferrite sheet.

10. The polygon NFC antenna of claim 2, wherein the fourth pattern is a square, a rectangle, an ellipse, or a circle.

11. The polygon NFC antenna of claim 2, wherein the fifth radiation part is arranged to have a parallel trace with single layer or multi-layer, a parallel wire routing with single layer or multi-layer, a cross trace with single layer or multi-layer, a cross wire routing with single layer or multi-layer, a twisted trace with single layer or multi-layer, or a twisted wire routing with single layer or multi-layer.

12. The polygon NFC antenna of claim 2, wherein the polygon NFC antenna is applied to a portable electronic device, and the first radiation part, the second radiation part, the third radiation part, the fourth radiation part, and the fifth radiation part are positioned on different surfaces of the portable electronic device for multi-position detection in NFC.

13. The polygon NFC antenna of claim 2, further comprising:
a first ferrite sheet, formed overlap the first radiation part;
a second ferrite sheet, formed overlap the second radiation part; and
a fourth ferrite sheet, formed overlap the fourth radiation part.

14. The polygon NFC antenna of claim 13, further comprising:
a third ferrite sheet, formed overlap the third radiation part; and
a fifth ferrite sheet, formed overlap the fifth radiation part.

15. The polygon NFC antenna of claim 14, wherein the first ferrite sheet, the second ferrite sheet, the third ferrite sheet, the fourth ferrite sheet, and the fifth ferrite sheet are integrated into a single ferrite sheet.

16. The polygon NFC antenna of claim 1, wherein the first pattern is a square, a rectangle, an ellipse, or a circle.

17. The polygon NFC antenna of claim 1, wherein the second pattern is a square, a rectangle, an ellipse, or a circle.

18. The polygon NFC antenna of claim 1, wherein the third radiation part has an opening coupled to the at least an antenna feed point, wherein the opening is in either the first or the second radiation parts.

19. The polygon NFC antenna of claim 1, wherein the third radiation part is arranged to have a parallel trace with single layer or multi-layer, a parallel wire routing with single layer or multi-layer, a cross trace with single layer or multi-layer, a cross wire routing with single layer or multi-layer, a twisted trace with single layer or multi-layer, or a twisted wire routing with single layer or multi-layer.

20. The polygon NFC antenna of claim 1, wherein the polygon NFC antenna is formed by a PCB process, an FPCB process, or a copper wire process.

21. The polygon NFC antenna of claim 1, wherein the polygon NFC antenna is applied to a portable electronic device, and the first radiation part, the second radiation part, and the third radiation part, are positioned on different surfaces of the portable electronic device for multi-position detection in NFC.

22. The polygon NFC antenna of claim 1, further comprising:
a first ferrite sheet, formed overlap the first radiation part; and
a second ferrite sheet, formed overlap the second radiation part.

23. The polygon NFC antenna of claim 22, further comprising:
a third ferrite sheet, formed overlap the third radiation part.

24. The polygon NFC antenna of claim 23, wherein the first ferrite sheet, the second ferrite sheet, and the third ferrite sheet are integrated into a single ferrite sheet.

* * * * *